3,037,622
HYDROGEN PEROXIDE STABILIZATION
Richard S. Treseder, Oakland, Calif., assignor to Shell Oil Company, a corporation of Delaware
No Drawing. Filed Dec. 14, 1959, Ser. No. 859,114
3 Claims. (Cl. 206—84)

This invention relates to a method for improving the stability of hydrogen peroxide. It deals with an improved method for protecting hydrogen peroxide from decomposition while in contact with aluminum.

Aluminum, tin, stainless steel, and glass are among the few practical materials of construction which can be safely used in long time or repeated short time contact with hydrogen peroxide. The aluminum used for fabrication of tanks, drums, piping, reactors, vats, and the like intended for service with hydrogen peroxide is usually a specially pure form of aluminum or an aluminum alloy predominating in aluminum of high purity. Even the purest of the commercially available aluminums used (1100 alloy) contain detectable amounts of heavy metals which are catalysts for the decomposition of hydrogen peroxide. These aluminum surfaces are attacked by hydrogen peroxide with the formation of pits and holes. The corrosion is the more rapid, usually, the more dilute the peroxide solution in the range of about 6 to 90% wt. hydrogen peroxide concentration. This corrosion of the aluminum surface results in the transfer of heavy metals impurities, especially iron, copper and chromium, from the aluminum to the hydrogen peroxide where they act as catalysts for decomposition of the peroxide.

It is an important object of the present invention to provide a method for overcoming the above-indicated difficulty encountered with hydrogen peroxide in contact with aluminum containing heavy metals. A special object is to provide a hydrogen peroxide package in which the peroxide has a greater stability than was heretofore attainable with a container having an interior surface of aluminum. Another object is the provision of hydrogen peroxide having improved stability in contact with aluminum. Still other objects and advantages of the invention will be apparent from the following description of suitable methods for carrying it out, although it will be understood that these are intended to be illustrative only since the invention is not limited thereto but includes other modes of application of the principles involved.

It has been found that the decomposition of hydrogen peroxide in contact with aluminum containing small amounts of heavy metals, can be retarded by dissolving an aluminum compound in the hydrogen peroxide. This is quite unexpected in view of the results reported in Schaidhauf patent—U.S. 1,275,765. The comparative tests of this patent showed that only an insoluble precipitate would have any advantage as a peroxide stabilizer. In the light of such teaching, based apparently on tests made in glass laboratory equipment, it was surprising to find that stability of hydrogen peroxide in contact with an aluminum surface can be improved by a clear solution of an aluminum compound in the peroxide. This improvement appears to be due to the fact that corrosion of the aluminum surface by the peroxide is reduced by the presence of the dissolved aluminum and contamination of the hydrogen peroxide by heavy metals introduced from the corroded aluminum is minimized. As a result catalysis of hydrogen peroxide decomposition by dissolved heavy metal is reduced with a corresponding reduction in the loss of hydrogen peroxide.

The addition of dissolved aluminum to the hydrogen peroxide appears to retard corrosion of aluminum surfaces in contact therewith through a mass action effect. Whether or not this is the true mechanism whereby the dissolved aluminum produces the observed improvement in the stability of $H_2O_2$ in contact with aluminum, there can be no doubt that the decomposition of the peroxide can thus be materially reduced with consequent saving of hydrogen peroxide whether or not undissolved aluminum compound is also present. However, it is preferred to operate only with completely dissolved aluminum.

Any aluminum compound soluble in the hydrogen peroxide can be used for introducing the required dissolved aluminum. As a general rule inorganic aluminum compounds will be used rather than organic compounds because of the tendency of the latter to cause loss by reaction with the hydrogen peroxide. There may be special circumstances in which such reaction may not be unduly detrimental considering the advantage to be obtained from the resulting dissolved aluminum. In such cases an organic aluminum compound can be added. This is especially the case with highly dilute hydrogen peroxide, for example, 3 to 6% solutions intended for medicinal applications for instance, which are not such powerful oxidation agents. With such solutions addition of certain types of organic aluminum compounds may have advantages for special purposes. Examples of organic aluminum compounds which can thus be used are: aluminum di- and tri-acetates, aluminum lactate, aluminum benzoate, aluminum salicylate, aluminum sulfanilate, aluminum benzene sulfonate, aluminum barbiturate, and the like. As a rule, however, inorganic aluminum compounds will be more advantageous both because of their generally lower cost and more ready availability and because of their greater resistance to reactions which lead to hydrogen peroxide loss. The chosen aluminum compound should be substantially free from heavy metals whose ions catalyze hydrogen peroxide decomposition, whether such metals are present as components of or impurities in the aluminum compound. Because of the greater stability of hydrogen peroxide under acid or neutral conditions, aluminum compounds which form solutions in hydrogen peroxide having a pH not greater than about 8 are generally preferred, to those which form solutions of higher pH although the latter may be useful under certain special circumstances. Representative examples of suitable aluminum compounds are: aluminum sulfate, the sodium, potassium and ammonium alums, aluminum nitrate, aluminum phosphate and the like.

The amount of aluminum compound which it will be most advantageous to use will vary somewhat depending upon the conditions to which the stabilized hydrogen peroxide is to be exposed. As a general rule it is desirable to use an amount corresponding to at least 1 part per million of aluminum in solution in the hydrogen peroxide. Larger amounts up to and including saturated solutions can be used but ordinarily amounts corresponding to about 2 to about 25 parts per million of dissolved aluminum in the hydrogen peroxide will be most suitable.

Any suitable method can be used for introducing the dissolved aluminum into the hydrogen peroxide whose decomposition in contact with aluminum to be inhibited. Most advantageously one or more of the before-indicated aluminum compounds is dissolved in the hydrogen peroxide during, or as soon as possible after, manufacture in order that the peroxide may be protected against decomposition whenever it contacts an aluminum surface not only during its production, but also in its purification, transportation, storage or final application. Alternatively the aluminum compound can be at any one of these later stages in the history of the hydrogen peroxide being stabilized.

The following examples illustrate typical methods of putting the invention into practice and show some of its advantages.

Example I

Comparative tests were made of the effect of adding 3 milligrams per liter of aluminum, introduced as $Al(NO_3)_3 \cdot 9H_2O$, to two samples of 35% wt. hydrogen peroxide from different sources. The tests were carried out with 800 ml. of hydrogen peroxide in quart glass jars, each containing one strip of ¾ x 3 x ⅛ inch type 5652 aluminum totally immersed in the peroxide solution and another strip of the same aluminum of the same size which was suspended so as to be ¾ in the hydrogen peroxide and ¼ in the vapor space thereabove so that the surface to volume ratio was equivalent to that of the standard 30 gallon aluminum drum used in shipping hydrogen peroxide. The aluminum strips were passivated prior to use in the tests by treatment for 15 minutes in 0.5% sodium hydroxide at room temperature, followed by 30 minutes treatment with a 35% nitric acid solution and immersion for five days in 35% hydrogen peroxide. The peroxide solutions used contained 110 mg. per liter each of anhydrous sodium pyrophosphate and sodium stannate having 3 molecules of water of crystallization and 410 mg. per liter of sodium nitrate. The pH of the solutions was 2.5. After three months storage at room temperature, the pick up of aluminum by the hydrogen peroxide solution was measured and the hydrogen peroxide stability determined by measuring the percent loss of hydrogen peroxide on heating for 24 hours at 100° C.

| Hydrogen Peroxide used | Duration of test (Months) | Aluminum in H₂O₂ (Milligrams per liter) | | Hydrogen Peroxide Stability (percent loss in 24 hrs. at 100° C.) | |
|---|---|---|---|---|---|
| | | Without added aluminum | 3 mg. per l. dissolved aluminum added | Without added aluminum | 3 mg. per l. dissolved aluminum added |
| Electrolytic | 0 | 0 | 3 | | |
| | 3 | 10.5 | 9.9 | 2.2-2.2 | 1.0-0.5 |
| Oxidation of an alcohol | 0 | 0 | 3 | | |
| | 3 | 11.1-12.1 | 10.6 | 2.4-2.2 | 1.0-1.2 |

Example II

Drums of 2 gallon capacity made of type 5052 aluminum which had been thoroughly passivated in the usual way were filled with 35% hydrogen peroxide which had been made by oxidation of an alcohol as in the case of the second sample of Example I. To one drum there was added 52 mg. per liter of aluminum sulfate equivalent to 8.2 mg. of aluminum per liter. No aluminum compound was added to the control drum. After storage at room temperature the stabilities of the hydrogen peroxide in the drums, as measured by loss of $H_2O_2$ on heating for 24 hours at 100° C., were as follows:

Control stored for 1010 hours—7.9% loss on heating 24 hrs. at 100° C.

Drum with added dissolved aluminum stored for 1368 hours—2.0% loss on heating 24 hrs. at 100° C.

At the end of the test periods, analyses of the peroxide solutions showed that 4.1 milligrams per liter of aluminum had been taken up from the drum by the control but that no aluminum had been taken up from the drum by the hydrogen peroxide in which the aluminum sulfate had been dissolved.

It will be seen that the invention offers important advantages and can be applied in a different way so that it is not restricted to the examples which have been given by way of illustration nor by any theory proposed in explanation of the improved results which are obtained.

I claim as my invention:

1. A package comprising a container having an interior surface of aluminum containing heavy metal impurities and liquid hydrogen peroxide therein, said hydrogen peroxide having dissolved therein sufficient of a member of the group consisting of the inorganic and organic aluminum salts to provide at least 1 part per million of aluminum essentially free from heavy metal catalysts for hydrogen peroxide decomposition dissolved in the hydrogen peroxide.

2. A package comprising a container having an interior surface of aluminum containing heavy metal impurities and liquid hydrogen peroxide therein, said hydrogen peroxide having dissolved therein sufficient inorganic aluminum salt to provide at least 1 part per million of aluminum essentially free from heavy metal catalysts for hydrogen peroxide decomposition dissolved in the hydrogen peroxide.

3. Hydrogen peroxide in contact with an aluminum surface containing heavy metal impurities, said hydrogen peroxide having dissolved therein sufficient of an inorganic aluminum salt essentially free from heavy metal catalysts for hydrogen peroxide decomposition to provide about 2 to about 25 parts per million of dissolved aluminum in the hydrogen peroxide.

References Cited in the file of this patent

UNITED STATES PATENTS

| | | |
|---|---|---|
| 2,008,726 | Reichert | July 23, 1935 |
| 2,208,471 | Penn | July 16, 1940 |
| 2,219,293 | Bretschger et al. | Oct. 29, 1940 |
| 2,219,294 | Bretschger et al. | Oct. 29, 1940 |
| 2,224,835 | Reichert et al. | Dec. 10, 1940 |
| 2,782,100 | Greenspan | Feb. 19, 1957 |

FOREIGN PATENTS

| | | |
|---|---|---|
| 233,856 | Germany | Apr. 24, 1911 |